(12) United States Patent
Awada et al.

(10) Patent No.: US 12,238,591 B2
(45) Date of Patent: Feb. 25, 2025

(54) UE ASSISTED DATA FORWARDING IN CONDITIONAL HANDOVER

(71) Applicant: Nokia Solutions and Networks Oy, Espoo (FI)

(72) Inventors: Ahmad Awada, Munich (DE); Guillaume Decarreau, Munich (DE); Ingo Viering, Munich (DE)

(73) Assignee: Nokia Solutions and Networks, Espoo (FI)

( * ) Notice: Subject to any disclaimer, the term of this patent is extended or adjusted under 35 U.S.C. 154(b) by 380 days.

(21) Appl. No.: 17/597,736

(22) PCT Filed: Jul. 30, 2019

(86) PCT No.: PCT/EP2019/070412
§ 371 (c)(1),
(2) Date: Jan. 21, 2022

(87) PCT Pub. No.: WO2021/018381
PCT Pub. Date: Feb. 4, 2021

(65) Prior Publication Data
US 2022/0322163 A1    Oct. 6, 2022

(51) Int. Cl.
*H04W 36/00* (2009.01)
(52) U.S. Cl.
CPC ... *H04W 36/0058* (2018.08); *H04W 36/0085* (2018.08)
(58) Field of Classification Search
CPC ......... H04W 36/0055; H04W 36/0058; H04W 36/0061; H04W 36/0083; H04W 36/00833; H04W 36/00835; H04W 36/00837; H04W 36/0085; H04W 36/0088; H04W 36/0094
See application file for complete search history.

(56) References Cited

U.S. PATENT DOCUMENTS

| 2012/0064886 A1 | 3/2012 | Kim et al. |
| 2016/0014666 A1 | 1/2016 | Miller et al. ...................... 36/30 |
| 2019/0223073 A1 | 7/2019 | Chen et al. ..................... 36/305 |

(Continued)

FOREIGN PATENT DOCUMENTS

| CN | 105472650 A | 4/2016 |
| WO | WO 2018/175819 A1 | 9/2018 |

(Continued)

OTHER PUBLICATIONS

3GPP TSG RAN WG2 #106, Reno, US, May 13-17, 2019, R2-1906216, "Suspend while monitoring CHO in NR", Ericsson, 4 pgs.

(Continued)

*Primary Examiner* — Matthew W Genack
(74) *Attorney, Agent, or Firm* — McCarter & English LLP

(57) ABSTRACT

A method for use by a communication device, wherein the method includes the steps of: receiving a handover command from one of a plurality of network cells which provides a communication service for the communication device, creating measurement data upon receiving the handover command, logging the measurement data and the end of the measurement after an execution condition to perform handover to another one of the plurality of network cells is fulfilled, and transmitting the logged measurement data to the other one of the plurality of network cells.

18 Claims, 5 Drawing Sheets

(56) References Cited

U.S. PATENT DOCUMENTS

2021/0345191 A1* 11/2021 Da Silva .............. H04W 24/10
2022/0369178 A1* 11/2022 Liu .................. H04W 36/0079

FOREIGN PATENT DOCUMENTS

WO    WO-2018/228702 A1    12/2018
WO    WO 2019/108114 A1    6/2019

OTHER PUBLICATIONS

"CFRA resources update for Conditional HO", Nokia, Nokia Shanghai Bell, 3GPP TSG-RAN WG2 Meeting #106, R2-1907262, May 2019, 3 pages.

"Discussions on NR Conditional Handover Procedures", MediaTek Inc., 3GPP TSG-RAN WG2 Meeting #106, R2-1906482, May 2019, 8 pages.

"LTE Conditional HO failure handling", Qualcomm Incorporated, 3GPP TSG-RAN WG2 Meeting #106, R2-1906662, May 2019, 4 pages.

"Discussions on Conditional Handover Procedures", MediaTek Inc., 3GPP TSG-RAN WG2 Meeting #105bis, R2-1903240, Apr. 2019, 7 pages.

\* cited by examiner

UE ASSISTED DATA FORWARDING IN CONDITIONAL HANDOVER

CROSS REFERENCE TO RELATED APPLICATION

This patent application is a U.S. National Stage application of International Patent Application Number PCT/EP2019/070412 filed Jul. 30, 2019, which is hereby incorporated by reference in its entirety.

TECHNICAL FIELD

At least some example embodiments relate to mobility in a cellular and mobile communication system such as Long Term Evolution (LTE) or New Radio (NR). In particular, at least some example embodiments relate to User Equipment (UE) assisted data forwarding in so-called "conditional handover" (CHO) which aims at improving mobility robustness.

LIST OF ABBREVIATIONS/ACRONYMS

3GPP 3$^{rd}$ Generation Partnership Project
ARQ Automatic Repeat Request
BS Base Station
CHO Conditional Handover
CQI Channel Quality Indicator
eMBB Enhanced Mobile Broadband
eNB Evolved NodeB
gNB Next generation NodeB
HARQ Hybrid automatic repeat request
HO Handover
ID Identifier
LTE Long Term Evolution
NR New Radio
OFDM Orthogonal Frequency Division Multiplexing
PCI Physical Cell ID
PRACH Physical Random Access Channel
RACH Random Access Channel
RAN Radio Access Network
RRC Radio Resource Control
RRM Radio Resource Management
SI International System of Units
UE User Equipment
Xn Interface between gNB-to-gNB, as defined in 3GPP TS 38.423

BACKGROUND

In case a mobile terminal such as a user equipment (UE) (also referred to in the following as "communication device") is assigned within a (cellular) communication network to one serving node (or "cell"), which is currently serving and/or associated to the mobile terminal, a handover (HO) will be performed to another node (or "cell"), which will subsequently serve the terminal in case of a handover condition. A typical handover condition occurs if a mobile terminal is moving within the cellular communication network across the geographical coverage of a respective node. However, the same geographical coverage can be served by a plurality of nodes or cells, and also in such scenarios, handover conditions may occur. For example, a (single) node may define different cells (e.g. distinguishable by different physical resources associated thereto) and a handover may thus occur at the same node but pertain to a handover from cell to cell. Various handover procedures are known, and among those, one handover procedure is a conditional handover (CHO).

Conditional HO (CHO):

The CHO procedure is similar to a legacy handover. A message sequence chart for a (typical and known) CHO procedure is shown in FIG. 1.

Entities involved in signalling are illustrated in horizontal arrangement as a terminal or user equipment (UE), a source gNB (currently serving/associated to the UE) and a target gNB (subsequently serving/associated to the UE), to which a handover or conditional handover CHO is (to be) performed. Source and target gNBs communicate via an interface Xn (not illustrated as such). Messages exchanged between such entities are illustrated as arrows, and actions/processing of messages at an entity are illustrated as boxes/circles. The time sequence of the messages is from "top-to-down" in the diagram.

The first steps (denoted by S1 to S8 in "Phase 1") are largely identical to the legacy handover. The source gNB performs measurement control (S1) of the UE. A configured event (S2) triggers the UE to send a measurement report (S3) to the serving gNB. Based on this report, the source gNB typically prepares the target gNB for the handover (Handover Request in S4 from the source gNB to the target gNB) and receives (in S5 from the target gNB) a Handover Request Acknowledgement and then sends a handover command to the UE (S6). This command includes a list of the cells or, in general, resources prepared for the handover. The target gNB in a step S7 prepares a corresponding reservation of the resources (cells) acknowledged in S5, and the UE, in a step S8, acknowledges the HO command to the source gNB.

For the legacy HO, the UE will immediately access the target cell/target gNB to complete the handover. Instead, for CHO, the UE will only access the target gNB once an additional CHO execution condition expires. The condition is typically configured, e.g., by the source gNB during HO Command in S6.

The advantage of the CHO is that the HO command (in S6) can be sent very early, in the so-called preparatory phase (phase 1), when the UE is still safe in the source cell, without risking the access in target cell and the stability of its radio link.

The HO Command is generated by the target cell and included into the "Handover Request Acknowledgement", before the source forwards it to the UE via Radio Resource Control (RRC) signaling.

The "actual" HO is performed in the CHO execution phase (phase 2, see steps S9 to S13). After the CHO execution condition is met, i.e. the CHO execution event occurs, see S9, the UE in a step S10 performs synchronization and random access with/towards the target gNB. Thereafter, a handover complete message is sent in S11 from the UE to the target gNB, and the target gNB acknowledges this in a step S12 in a handover complete acknowledgment message to the source gNB. In a subsequent step/stage S13, the UE and source gNB will adapt to the extent that the "old" i.e. previous preparations or settings are not valid anymore for them. Insofar, after the (HO or) CHO is completed, the target gNB will become the new source gNB.

In CHO, as there could be a significant time-delay between HO preparation and the actual HO execution, the situation at the target cell can potentially change during this time.

Furthermore, as shown in FIG. 1, after receiving the handover command, the UE would not execute the handover immediately to the target cell but rather waits until the CHO execution condition is fulfilled which may take some time. As such, the source cell is not aware of the time instant that the UE detaches from the source cell and performs Random Access Channel (RACH) access to the target cell, which impacts data forwarding from the source to target cell.

In the baseline handover scheme of NR Rel. 15, the source cell starts forwarding of UE packets upon sending the handover command to the UE.

This is useful as the UE is expected to access the target cell immediately after receiving the handover command.

However, in CHO the source cell is not aware of the time instant that the UE detaches from the source cell and as such it does not have any information for triggering timely the data forwarding, i.e., when the UE has detached from source cell or shortly before.

In the prior art several methods are suggested to deal with this problem.

Method 1: Similar to the baseline handover, the source cell can start data forwarding upon sending the handover command to the UE.

This may lead to unnecessary forwarding of many UE data packets (consuming resources over the Xn interface) as the UE is still sending and receiving from the source cell. The impact is even higher when multiple targets are prepared for CHO.

Method 2: The source cell starts data forwarding when it receives from the target cell an indication that the RACH access is completed by the UE.

This scheme does not cause unnecessary forwarding of data packets, however, it may cause service interruption if the UE connects to the target cell before the user packets are ready in the target BS.

This is especially relevant for contention-based random access where the target BS can send the indication only when the third message in the random access procedure, called also "Msg3", is received from the UE.

Nevertheless, the source cell may roughly approximate the time instant of CHO execution from the time instant that it received the indication from the target cell.

However, this estimation is subject to errors that are caused by RACH re-transmissions, guessing Physical Random Access Channel (PRACH) occasion periodicity of the target cell if not known by the source cell, UE and target cell processing delays, delay over the Xn interface, etc.

Method 3: The source cell may estimate when the UE has detached based on missing e.g., Channel Quality Indicator (CQI) or Hybrid automatic repeat request/automatic repeat request (HARQ/ARQ) feedback reports. For this procedure to be reliable, the source cell should wait and check for some time that the missing CQI, HARQ/ARQ feedback reports are lost because the UE has detached and not because of temporary and instantaneous changes in channel ("false alarm"), which again creates uncertainty about the CHO execution time instant.

Method 4: The UE may try to inform the source cell by means of RRC signaling when the CHO execution condition is fulfilled, also called the "bye" message.

This approach is de-prioritized in 3GPP discussions since the indication sent by the UE may not be received at the time instant that the UE performs access to target cell.

Method 5: During completion of the CHO, the source cell gets an indication from the target cell, that the UE has accessed the target cell (e.g. HO Complete). Based on this, the source cell can roughly determine when an execution condition has triggered, and thereby when forwarding should have happened.

However, similar to method 2 this information is very coarse, since the time between triggering of execution condition and receiving the indication from the target cell is unknown and can be significant (involves RACH procedure and Xn signaling).

SUMMARY

It is an object of at least some of example embodiments to improve the prior art.

This object is achieved by the methods, apparatuses and non-transitory storage media as specified in the appended claims.

Further, computer program products, comprising computer executable code, which, when executed by a processor, perform the method according to any of the method aspects are provided.

According to at least some example embodiments, at least one of the following advantages are achieved:

Source cell obtains reliable and accurate statistics from the handed over UEs which it can leverage for more timely triggering of data forwarding, which leads to a better trade-off between interruption through late forwarding, and unnecessary forwarding through early forwarding.

The proposed scheme further allows to take into account different mobility scenarios for different cell boundaries, e.g., for HO from source cell A to target cell B (e.g., low speed mobility) or from source cell A to target cell C (e.g., high speed mobility). Therefore, it enables the grouping of UEs depending on their speed of movement.

The source cell does not have to wait or rely on unreliable information (e.g., missing CQI or HARQ acknowledgements), which are only used and considered as a substitute for tailored CHO signaling and whose absence may also have other reasons than the HO to another cell (e.g., very deep fading event).

The statistical nature of the logged measurement data allows to make decisions with different reliability levels (e.g., based on percentiles) to accommodate for the need of different data services allowing for more conservative or more liberal policies, respectively.

Ultimately, this supports and improves the user quality of experience because of increased service continuity.

Further advantages become apparent from the following detailed description.

BRIEF DESCRIPTION OF THE DRAWINGS

Further details, features, objects, and advantages are apparent from the following detailed description of example embodiments of at least some aspects, which is to be taken in conjunction with the appended drawings, wherein.

DETAILED DESCRIPTION OF CERTAIN EXAMPLE EMBODIMENTS

Herein below, certain aspects are exemplified by at least some embodiments which are described in detail with reference to the accompanying drawings. Features of the example embodiments can be freely combined with each other unless otherwise described. However, it is to be expressly understood that the description of certain example embodiments/aspects is given by way of example only, and that it is not intended to be understood as limiting the application to the details disclosed.

It is to be understood that any of the modifications mentioned can be applied singly or in combination to the respective aspects to which they refer, unless they are explicitly stated as excluding alternatives.

Moreover, it is to be understood that the apparatus is configured to perform the corresponding method, although in some cases only the apparatus or only the method are described.

According to at least some example embodiments, a communication device (also referred to as "user equipment (UE)") creates measurement data e.g. once it receives an HO command from a source cell (also referred to as "one of a plurality of cells" in the following). If an execution condition is fulfilled, the communication device logs the end of the measurement and stops creating measurement data, in order to perform the HO to a target cell (also referred to as "another one of the plurality of cells" in the following). The acquired measurement data is transmitted to the target cell.

Figure 2:
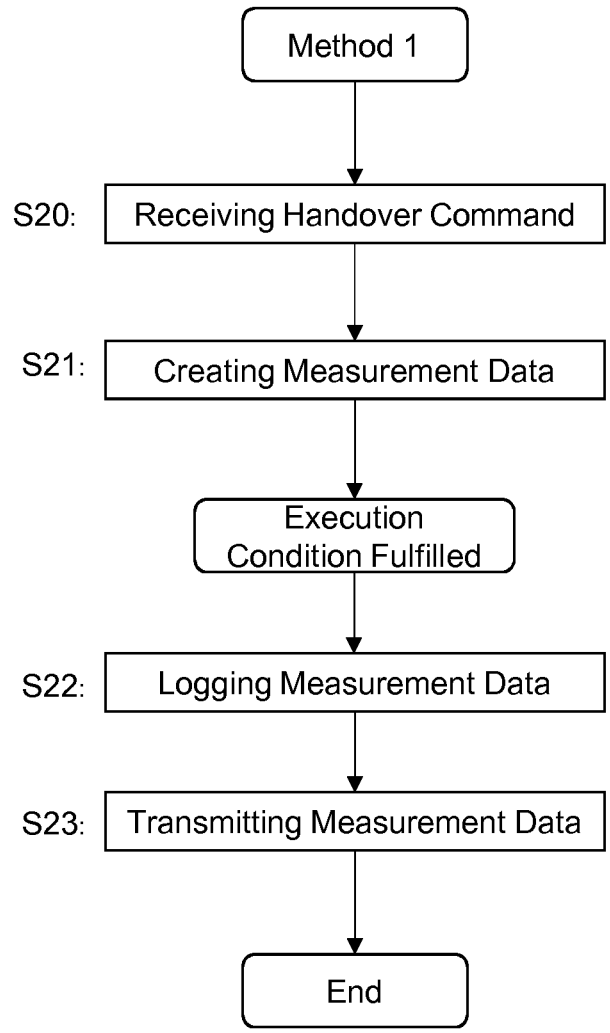
FIG. 2 shows a flowchart illustrating an example method according to at least some embodiments.

In FIG. 2, the method according to at least some example embodiments is illustrated. A communication device receives (S20) an HO command from one of a plurality of cells. Each of the plurality of cells provides a communication service for the communication device. Subsequently, the communication device collects (S21) measurement data. If an execution condition is fulfilled, a HO to another one of the plurality of cells is performed. Further, the collected measurement data is logged (S22) and transmitted (S23) to the other one of the plurality of cells.

According to an example implementation, the communication device indicates the availability of log information (e.g. the logged measurement data) to the target cell, after the execution condition is fulfilled and the end of the measurement was logged. According to an example implementation, the indication about availability of logged measurement data is transmitted upon completion of the handover and a RACH access between the communication device and the target cell.

Additionally, according to an example implementation, the user equipment receives a request from the target cell to report the logged measurement data, after the previously mentioned indication has been received by the target cell.

According to an example implementation, the execution condition is a CHO condition, that was sent as part of the HO request from the source cell. According to an example implementation, the measurement data also contains data about different time instants and elapsed times:

For example, the logged measurement data contains information about the time instant, in which the CHO condition was fulfilled.

For example, the logged measurement data contains data about the elapsed time between the reception of the CHO command and the time instant, in which the CHO execution condition is fulfilled.

For example, the logged measurement data contains data about the elapsed time between the transmission of a measurement report from the communication device to the source cell that triggered the CHO configuration and the time instant, in which the CHO execution condition is fulfilled.

For example, additionally, the logged measurement data comprises cell identifiers (PCIs) of the source and/or target cells.

According to an example implementation, the transmission of logged measurement data is performed right after or during the completion of the HO execution.

In at least some of the above-mentioned cases, the notion of "elapsed time" can be measured in the usual SI units of seconds and milliseconds and/or in the number of elapsed radio frames, sub-frames, slots or Orthogonal Frequency Division Multiplexing (OFDM) symbols.

According to at least some example embodiments, a network entity, e.g. a target cell (also referred to as "one of the plurality of network cells"), receives logged measurement data from an UE. The logged measurement data comprises data, which was acquired by the UE at least during the time it received a HO command from its source cell (also referred to as "another of the plurality of network cells") and the time instant, where an execution condition is fulfilled. The target cell then transmits the logged measurement data to the source cell.

Figure 3:
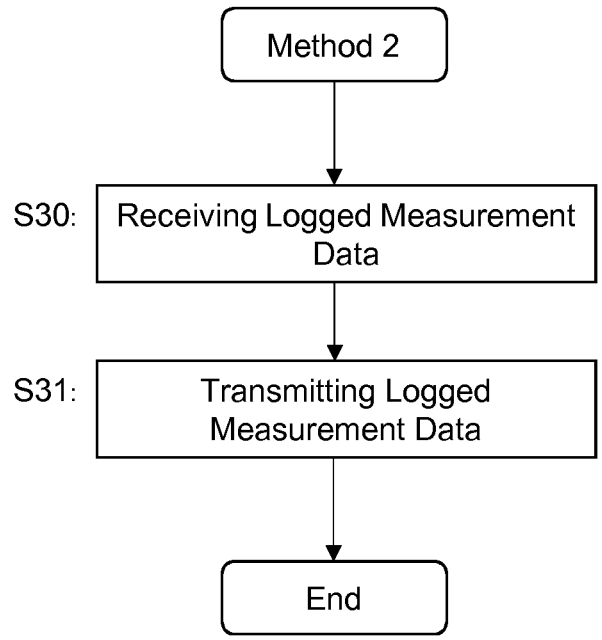
FIG. 3 shows a flowchart illustrating an example method according to at least some embodiments.

In FIG. 3, the method according to at least some example embodiments is illustrated. At least one of a plurality of cells receives (S30) measurement data which was created in response to a HO command from another one of the plurality of cells and was logged after an execution condition was fulfilled. Further, the received logged measurement data is transmitted (S31) to another one of the plurality of cells.

According to an example implementation, an indication of availability of log information is received by the target cell, before it actually receives the logged measurement data.

According to an example implementation, the target has sent a request to the UE to report the logged measurement data after receiving an indication of availability of log information, before it actually receives the logged measurement data.

According to an example implementation, the execution condition is a CHO condition, that was sent as part of the HO Command from the source cell.

According to an example implementation, the measurement data also contains data about time instants. For example, the logged measurement data contains information about the time instant, in which the CHO condition was fulfilled. In another example, the logged measurement data contains information about elapsed time between 1) the reception of the handover command or the transmission of the measurement report that triggered the CHO configuration and 2) the time instant in which CHO execution condition is fulfilled.

Further, according to an example implementation, the time instant is represented by a timestamp or, alternatively, by a number/index of a radio frame and sub-frame/slot/OFDM symbol at which the CHO execution condition was fulfilled.

According to an example implementation, the source cell logs the time instant, when it sends the HO command to the UE or when a measurement report is received from the UE. Further, for example, the time instant is represented by a timestamp or, alternatively, by the number/index of the radio frame and sub-frame/slot/OFDM symbol at which the HO command has been sent or when the measurement report is received.

According to an example implementation, the target cell forwards the logged measurement data to the source cell via an Xn interface to improve the source cell's future handling of CHOs.

Using this information, the source cell can gather statistics about the time durations between a sent HO command and the time the associated CHO condition is fulfilled. This allows to make better decisions regarding the time instant, at which the source cell should stop forwarding data to the target cell.

For instance, if all time durations between a sent HO command and the time the associated CHO condition is fulfilled are greater than X ms, then the source cell may not trigger any data forwarding for a handed over UE before some time duration T less than X ms has expired.

Another example would be that if the statistics expose a sharp peak at Y ms with little standard deviation, then the source cell should not wait until receiving an indication from the target cell (which is the baseline method as discussed above). In general, these statistics may be used by a machine learning algorithm running at the source cell which determines the time instant for triggering of data forwarding with respect to a specific target cell, i.e., machine learning algorithm is implementation specific.

Figure 1:
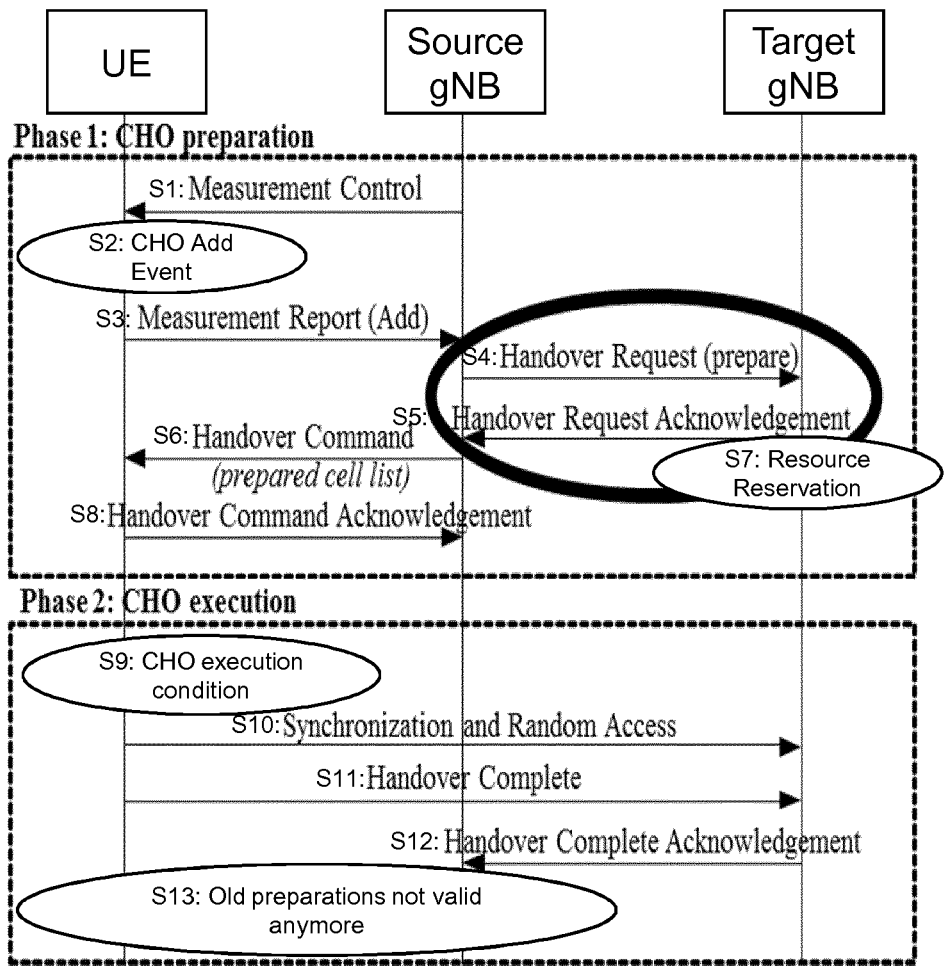
FIG. 1 shows a signaling diagram illustrating the steps of a CHO preparation and execution procedure.
Figure 4:
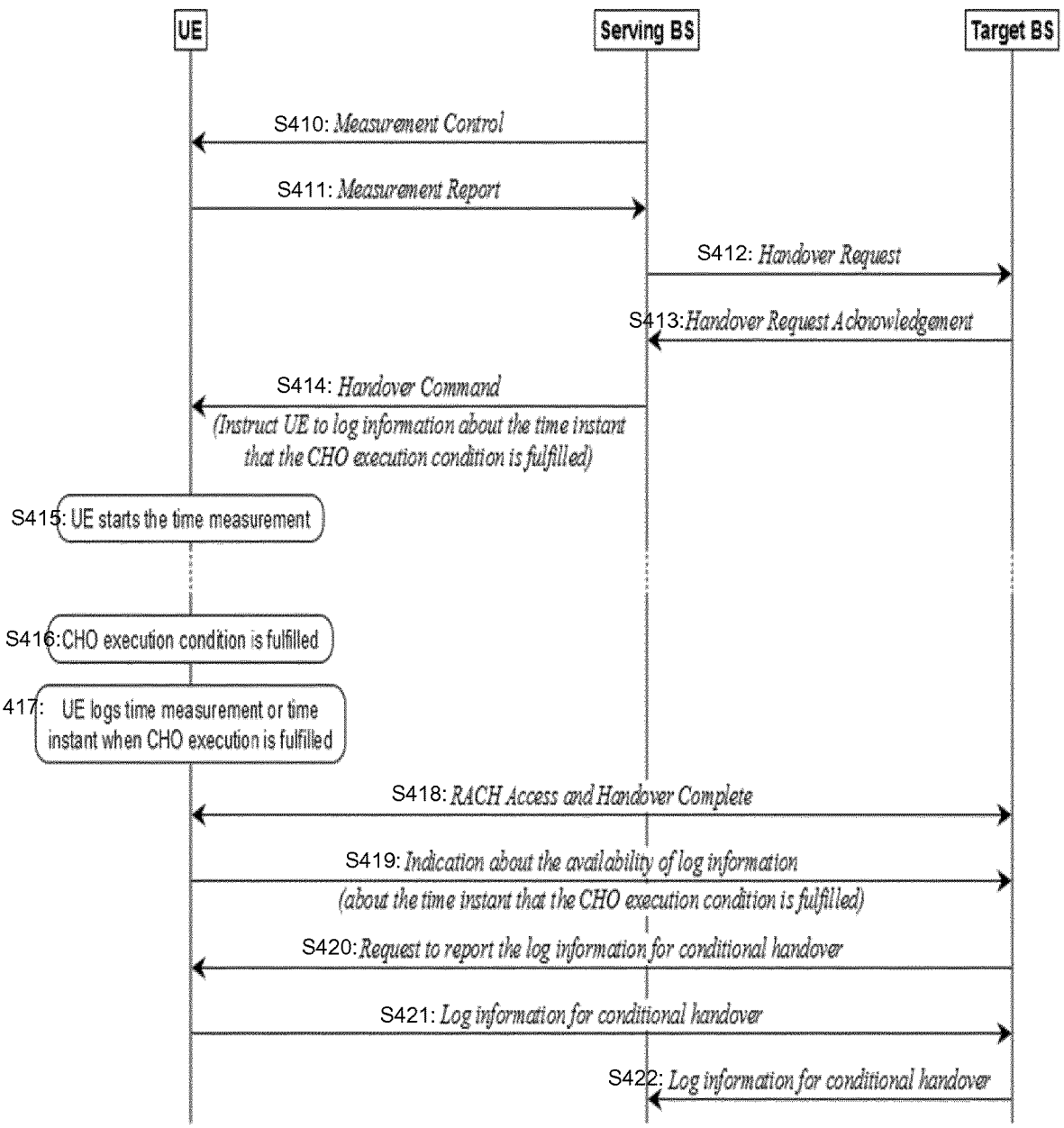
FIG. 4 shows a signaling diagram illustrating steps of a CHO preparation procedure and an example of a CHO execution procedure with acquiring, logging and exchanging CHO related measurement data according to at least some example embodiments.

FIG. 4 shows a signaling chart of a CHO procedure according to an example implementation. As for FIG. 1 entities involved in signaling are illustrated in horizontal arrangement as a user equipment (UE), a serving BS (e.g. source gNB, BS currently serving/associated to the UE) and a target BS (e.g. target gNB, BS subsequently serving/associated to the UE), to which a handover or conditional HO is (to be) performed. Serving and target BSs communicate via an interface Xn (not illustrated as such). Messages exchanged between such entities are illustrated as arrows and actions/processing of messages at an entity are illustrated as boxes/circles. The time sequence of the messages is from "top-to-bottom" in the diagram.

In the beginning of the relevant procedure, the serving BS (source cell) sends a measurement control message (S410) to the UE. The UE then sends a measurement report (S411) to the source cell, which triggers a HO request (S412) from the source cell to the target BS (target cell). This request is acknowledged by a HO request acknowledgement (S413) from the target cell to the source cell. After this, the source cell issues an HO command (S414) to the UE. After receiving the HO command, the UE starts the time measurement (S415) and waits until the CHO execution condition is fulfilled (S416). Once the corresponding CHO execution condition is fulfilled, the UE logs the respective elapsed time duration or time instant (S417). Next, an RACH access takes place and the HO is completed (S418). In a subsequent step, the UE transmits an indication about the availability of logged measurement data to the target cell (S419) containing information about the time instant that the CHO execution condition was fulfilled. The target cell signals its interest in the information by requesting to report the logged measurement data (S420) and the UE sends it accordingly (S421). Eventually, the target cell forwards the logged measurement data to the source cell for further use (S422).

It can be understood that the steps of FIGS. 2 and 3 are also reflected in the example procedure of FIG. 4. Receiving an HO command in step S20 corresponds to step S414, in which the source cell issues an HO command to the UE. In step S21 measurement data is created, which is also created in the example embodiment of FIG. 4 in steps S415, S416. As soon as an execution condition is fulfilled, measurement data is logged (step S22, S417, respectively). Then, the measurement data is transmitted from the UE and received at the target cell (steps S23, S421, S30, respectively). Lastly, the logged measurement data is transmitted by the target cell to the source cell in steps S31, S422, respectively.

Figure 5:
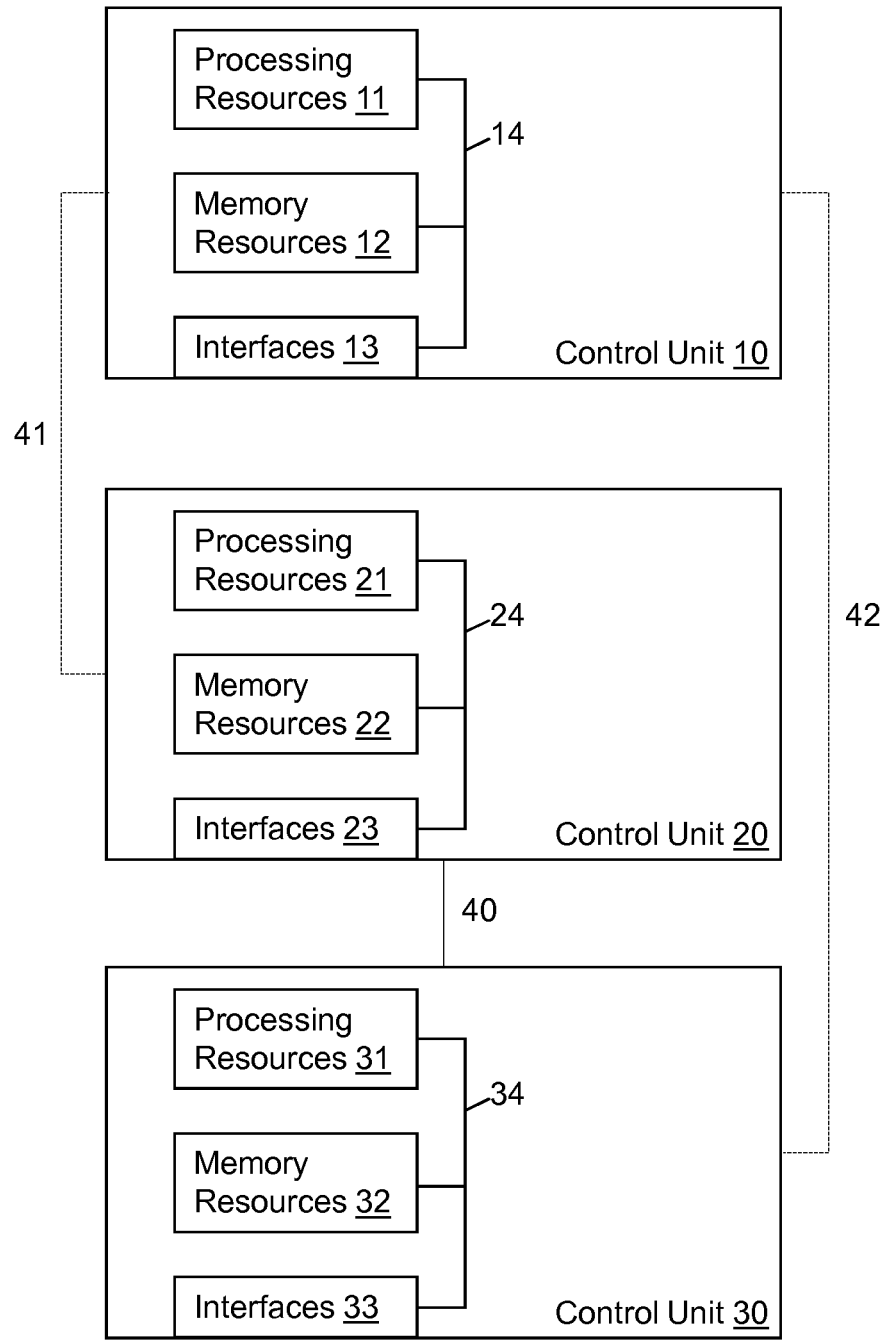
FIG. 5 shows a schematic block diagram illustrating a configuration of control units in which at least some example embodiments are implementable.

FIG. 5 depicts control units 10, 20, and 30, each comprising processing resources (e.g. processing circuitry) 11, 21, 31, memory resources (e.g. memory circuitry) 12, 22, 32 and interfaces (e.g. interface circuitry) 13, 23, 33. In at least one exemplary embodiment, the control unit 10 is configured to be implemented in and/or used by a UE, e.g. the communication device as described above and/or the UE shown in FIG. 4, the control unit 20 is configured to be implemented in and/or used by a serving BS, e.g. source cell and/or serving BS shown in FIG. 4, and the control unit 30 is configured to be implemented in and/or used by a target BS, e.g. target cell and/or target BS shown in FIG. 4. Further, each control unit has an own bus system 14, 24, 34 which connects the aforementioned resources such that data can be exchanged between the three components of a unit. In addition, control units 10 and 20, as well as control units 10 and 30 can be connected wirelessly via links 41, 42. Control unit 20 and control unit 30 further have an additional Xn interface 40, which enables a connection between the respective units and their resources.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The definitions indicated in the present description are based on the current 3GPP standards. However, they are not limiting. Other definitions according to the same or a corresponding concept are applicable to some example embodiments, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments provide, for example, a base station such as a gNB, or a component thereof, an apparatus embodying the same, a method for controlling and/or operating the same, and computer program(s) controlling and/or operating the same as well as mediums carrying such computer program(s) and forming computer program product(s).

In general, the various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

Further, as used in this application, the term "circuitry" refers to one or more or all of the following:
  (a) hardware-only circuit implementations (such as implementations in only analog and/or digital circuitry) and
  (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
  (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus for use by a communication device is provided. For example, the apparatus comprises the control unit 10 shown in FIG. 5. According to another example implementation or in addition, the apparatus is configured to execute the method 1 illustrated in FIG. 2.

The apparatus comprises means for receiving a handover command from one of a plurality of network cells which provides a communication service for the communication device, means for creating measurement data upon receiving the handover command, means for logging the measurement data and the end of the measurement after an execution condition to perform handover to another one of the plurality of network cells is fulfilled, and means for transmitting the logged measurement data to the other one of the plurality of network cells.

According to an example implementation, the apparatus further comprises means for transmitting an indication about availability of logged measurement data to the other one of the plurality of network cells, which provides the communication service, after logging the measurement data and the end of the measurement after the execution condition to perform handover to the other one of the plurality of network cells is fulfilled.

According to an example implementation, the apparatus further comprises means for receiving a request to report logged measurement data from the other one of the plurality of network cells, which provides the communication service, upon transmitting the indication about availability of logged measurement data to the other one of the plurality of network cells, which provides the communication service.

In an example implementation, the execution condition is a condition for conditional handover, CHO.

In an example implementation, the transmission of logged measurement data is performed directly after or during the completion of the handover execution.

In an example implementation, the transmission of the indication about availability of logged measurement data is performed upon completion of the handover and a random access channel (RACH) access between the communication device and the other one of the plurality of network cells.

In an example implementation, the logged measurement data comprises data related to the time instant where the CHO condition is fulfilled.

In an example implementation, the information related to the time instant that the CHO condition is fulfilled comprises at least one of the time instant when the CHO execution condition is fulfilled and the elapsed time between the reception of the handover command and the time instant that the CHO execution condition is fulfilled.

In an example implementation, the information related to the time instant that the CHO condition is fulfilled comprises the elapsed time between the transmission of the measurement report that triggered the CHO configuration and the time instant that the CHO execution condition is fulfilled.

In an example implementation, the elapsed time is indicated in seconds or milliseconds.

In an example implementation the elapsed time is indicated by an elapsed number of at least one of radio frames, sub-frames, slots or Orthogonal Frequency Division Multiplexing, OFDM, symbols.

In an example implementation, the logged measurement data comprises the physical cell identifier, PCI, of at least one of the network cells providing the communication service.

In an example implementation, the plurality of network cells providing the communication service comprises a target cell and a source cell.

According to at least some example embodiments, an apparatus for use by at least one of a plurality of network cells which provides a communication service for a communication device is provided. For example, the apparatus is part of a target cell and comprises the control unit 30 shown in FIG. 5. According to another example implementation or in addition, the apparatus is configured to execute the method 2 illustrated in FIG. 3.

The apparatus comprises means for receiving logged measurement data from the communication device, wherein the logged measurement data is created in response to the communication device receiving a handover command from another one of the plurality of network cells and is logged after an execution condition to perform handover to the one of the plurality of network cells is fulfilled, and means for transmitting the logged measurement data to the other one of the plurality of network cells.

According to an example implementation, the apparatus further comprises means for receiving an indication about availability of logged measurement data before the logged measurement data is received.

According to an example implementation, the apparatus further comprises means for transmitting a request for reporting logged measurement data to the communication device upon receiving the indication about availability of logged measurement data.

In an example implementation, the execution condition is a condition for conditional handover, CHO.

In an example implementation, the logged measurement data comprises data related to the time instant in which the CHO condition is fulfilled.

According to an example implementation, the apparatus further comprises means for retrieving the logged measurement data and means for forwarding the logged measurement data to the other one of the plurality of network cells via an Xn interface.

According to a further example, the apparatus is part of a serving cell and comprises the control unit 20 shown in FIG. 5. According to another example implementation or in addition, the apparatus is configured to execute the method 2 illustrated in FIG. 3.

In an example implementation, the apparatus further comprises means for logging the time instant when it sends the handover command to the communication device or when a measurement report was received from the communication device.

In an example implementation, the time instant comprises at least one of a timestamp or at least one of the number or index of radio frames and at least one of sub-frames, or slots, or OFDM symbols at which the execution condition was fulfilled.

According to an example implementation, the apparatus further comprises means for gathering statistics from the logged measurement data.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. A method for use with a communication device, the method comprising:
receiving a handover command from one of a plurality of network cells which provides a communication service for the communication device,
creating measurement data upon receiving the handover command,
logging the measurement data and an end of the measurement after an execution condition to perform handover to another one of the plurality of network cells is fulfilled, and
transmitting the logged measurement data to the another one of the plurality of network cells,
wherein the logged measurement data comprises data related to a time instant where a conditional handover condition is fulfilled, comprising
an elapsed time, between reception of the handover command and the time instant of the execution condition of the conditional handover, is fulfilled; and
receiving a request to report logged measurement data from the another one of the plurality of network cells, which provides the communication service, upon transmitting an indication about availability of logged measurement data to the another one of the plurality of network cells, which provides the communication service.

2. The method according to claim 1, wherein the transmitting the indication about availability of logged measurement data to the another one of the plurality of network cells, which provides the communication service, is after logging the measurement data and the end of the measurement after the execution condition to perform handover to the other another one of the plurality of network cells is fulfilled.

3. The method according to claim 1, wherein the execution condition is a condition for the conditional handover.

4. The method according to claim 1, wherein the transmission of logged measurement data is performed directly after or during the completion of the handover execution.

5. The method according to claim 1, wherein the transmission of the indication about availability of logged measurement data is performed upon completion of the handover and a random access channel access between the communication device and the another one of the plurality of network cells.

6. A method for use with at least one of a plurality of network cells, the method comprising:
receiving, with one of the plurality of network cells which provides a communication service for a communication device, logged measurement data from the communication device, wherein the logged measurement data is created in response to the communication device receiving a handover command from another one of the plurality of network cells and is logged after an execution condition to perform handover to the one of the plurality of network cells is fulfilled,
transmitting a request to report the logged measurement data from the another one of the plurality of network cells, which provides the communication service, upon transmitting the indication about availability of logged measurement data to the another one of the plurality of network cells, which provides the communication service, and
transmitting the logged measurement data to the-another one of the plurality of network cells, wherein the logged measurement data comprises data related to a time instant where the conditional handover condition is fulfilled comprising an elapsed time, between reception of the handover command and the time instant of the execution condition of the handover, is fulfilled.

7. The method according to claim 6, further comprising:
receiving the indication about availability of logged measurement data with the one of the plurality of network cells before the logged measurement data is received.

8. The method according to claim 6, further comprising:
transmitting a request for reporting logged measurement data with the one of the plurality of network cells to the communication device upon receiving the indication about availability of logged measurement data.

9. The method according to claim 6, wherein the execution condition is a condition for a conditional handover.

10. The method according to claim 6, wherein the one of the plurality of network cells is a target cell and the other of the plurality of network cells is a source cell, and wherein the method further comprises:
logging, with the source cell, the time instant when it sends the handover command to the communication device or when a measurement report was received from the communication device.

11. The method according to claim 10, wherein the time instant comprises at least one of:
a timestamp, or
at least one of:
the number or index of radio frames, or
at least one of:
sub-frames, or
slots, or
OFDM symbols
at which the execution condition was fulfilled.

12. The method according to claim 6, further comprising: retrieving the logged measurement data with the one of the plurality of network cells and forwarding the logged measurement data to the another one of the plurality of network cells via an Xn interface, wherein the one of the plurality of network cells is a target cell and the another one of the plurality of network cells is a source cell.

13. An apparatus for use with a communication device, the apparatus comprising:
at least one processor;
and at least one memory is-storing instructions that when executed by the at least one processor, cause the apparatus at least to perform:
receiving a handover command from one of a plurality of network cells which provides a communication service for the communication device,
creating measurement data upon receiving the handover command, logging the measurement data and an end of the measurement after an execution condition to perform handover to another one of the plurality of network cells is fulfilled, and
transmitting the logged measurement data to the another one of the plurality of network cells,
wherein the logged measurement data comprises data related to a time instant where a conditional handover condition is fulfilled, comprising
an elapsed time, between reception of the handover command and the time instant of the execution condition of the conditional handover, is fulfilled; and
receiving a request to report logged measurement data from the another one of the plurality of network cells, which provides the communication service, upon transmitting the indication about availability of logged measurement data to the another one of the plurality of network cells, which provides the communication service.

14. The apparatus according to claim 13, wherein the at least one memory is storing instructions that when executed by the at least one processor, cause the apparatus to further perform:
transmitting the indication about availability of logged measurement data to the other one of the plurality of network cells, which provides the communication service, after logging the measurement data and the end of the measurement after the execution condition to perform handover to the another one of the plurality of network cells is fulfilled.

15. The apparatus according to claim 13, wherein the execution condition is a condition for the conditional handover.

16. The apparatus according to claim 13, wherein the at least one memory is storing instructions that when executed by the at least one processor, cause the apparatus to further perform:
transmitting the logged measurement data directly after or during the completion of the handover execution.

17. The apparatus according to claim 13, wherein the at least one memory is storing instructions that when executed by the at least one processor, cause the apparatus to further perform:
transmitting the indication about availability of logged measurement data upon completion of the handover and a random access channel access between the communication device and the another one of the plurality of network cells.

18. An apparatus for use with at least one of a plurality of network cells which provides a communication service for a communication device, the apparatus comprising at least one processor and at least one memory is-storing instructions that when executed by the at least one processor, cause the apparatus at least to perform:
receiving logged measurement data from the communication device, wherein the logged measurement data is created in response to the communication device receiving a handover command from another one of the plurality of network cells and is logged after an execution condition to perform handover to the one of the plurality of network cells is fulfilled,
transmitting a request to report the logged measurement data from the another one of the plurality of network cells, which provides the communication service, upon transmitting the indication about availability of logged measurement data to the another one of the plurality of network cells, which provides the communication service, and
transmitting the logged measurement data to the another one of the plurality of network cells,
wherein the logged measurement data comprises data related to a time instant in which a conditional handover condition is fulfilled comprising an elapsed time, between reception of the handover command and the time instant of the execution condition of the conditional handover, is fulfilled.

* * * * *